(12) United States Patent
Hadley et al.

(10) Patent No.: US 8,191,440 B2
(45) Date of Patent: Jun. 5, 2012

(54) ACTUATOR

(75) Inventors: Kevin Richard Hadley, Much Wenlock (GB); Mark David Timms, Wolverhampton (GB)

(73) Assignee: Goodrich Actuation Systems Limited, Solihull (GB)

( * ) Notice: Subject to any disclaimer, the term of this patent is extended or adjusted under 35 U.S.C. 154(b) by 381 days.

(21) Appl. No.: 12/511,580

(22) Filed: Jul. 29, 2009

(65) Prior Publication Data
US 2010/0024580 A1    Feb. 4, 2010

(30) Foreign Application Priority Data
Jul. 30, 2008  (GB) .................................. 0813906.5

(51) Int. Cl.
*F16H 3/06* (2006.01)
*F16H 27/02* (2006.01)
*F16H 29/02* (2006.01)
*F16H 29/20* (2006.01)

(52) U.S. Cl. ...................... 74/89.39; 74/89.34
(58) Field of Classification Search .............. 74/89.23, 74/89.34, 89.37, 89.39; 244/102 SL
See application file for complete search history.

(56) References Cited

U.S. PATENT DOCUMENTS

| | | | |
|---|---|---|---|
| 2,667,953 A | 2/1954 | Griswold | |
| 3,053,104 A | 9/1962 | Scavini | |
| 3,421,383 A * | 1/1969 | Widmoyer et al. | 74/89.35 |
| 3,811,136 A * | 5/1974 | Whitney et al. | 600/573 |
| 5,398,780 A * | 3/1995 | Althof et al. | 185/39 |
| 5,778,733 A * | 7/1998 | Stringer | 74/527 |
| 2007/0144846 A1 | 6/2007 | Bucheton et al. | |

OTHER PUBLICATIONS

European Search Report dated Oct. 19, 2009.

* cited by examiner

*Primary Examiner* — Justin Krause
(74) *Attorney, Agent, or Firm* — Andrus, Sceales, Starke & Sawall, LLP

(57) ABSTRACT

An actuator comprises a screw shaft, a nut translatable along the shaft between a retracted position and an extended position, a tine component carried by the nut, the tine component including tine fingers formed with projections each being engageable with a formation provided on a housing when the nut occupies its extended position to secure the nut against axial movement, and a lock member engageable with the tine fingers to restrict radial movement of the tine fingers.

11 Claims, 4 Drawing Sheets

ACTUATOR

This invention relates to an actuator, and in particular to an actuator suitable for use in aerospace applications. The actuator is particularly suitable for use in driving the landing gear of an aircraft between stowed and deployed positions, but may be used in other applications.

It is known to use hydraulically powered actuators in driving the landing gear of an aircraft between stowed and deployed positions. In the event of a failure in the actuator, or the associated control arrangement, the actuator can be switched to a condition in which the landing gear can fall under the action of gravity to its deployed position in which it can be locked against movement. In this manner, safe landing of the aircraft can be achieved. Once on the ground, appropriate repairs can be undertaken to permit the landing gear to be driven to its stowed position after take-off.

Increasingly there is a desire to use electrically powered rather than hydraulically powered actuators in driving the landing gear between stowed and deployed positions. Such actuators typically suffer from the disadvantage that allowing movement of the landing gear to its deployed position under the action of gravity, in the event of a jam or other failure, is difficult to achieve. Even where such movement is achievable, locking of the landing gear in its deployed position may not be possible.

There is a desire to provide an arrangement in which, in the event of such a failure, the landing gear can be allowed to move to its deployed position under the action of gravity, and that in the event of such movement, the landing gear can be locked in the deployed position and subsequently can be driven back to its stowed position using the motor. Such an automated resetting arrangement is advantageous in that it permits regular testing of the actuator.

It is an object of the invention to provide an actuator in which the disadvantages set out hereinbefore are overcome or of reduced effect.

According to the present invention there is provided an actuator comprising a screw shaft, a nut translatable along the shaft between a retracted position and an extended position, a tine component carried by the nut, the tine component including tine fingers formed with projections each being engageable with a formation provided on a housing when the nut occupies its extended position to secure the nut against axial movement, and a lock member engageable with the tine fingers to restrict radial movement of the tine fingers.

In such an arrangement, as the nut reaches its extended position the projections of the tine fingers ride over the formations provided on the housing, the tine fingers deflecting to permit such movement, whereafter the lock member serves to restrict radial movement of the tine fingers, preventing the projections from returning over the formation, thus locking the nut in its extended position against axial movement.

The lock member is preferably resiliently biased, conveniently by a resilient spring, towards a locked position, the lock member preferably being moveable away from the locked position by means of an actuator, for example in the form of a solenoid actuator. The movement of the nut towards its extended position conveniently deflects the lock member away from its locked position, the lock member returning to its locked position due to the biasing thereof, locking the nut against movement, once the extended position is reached. In such arrangement, locking of the nut against movement away from the extended position is automatic, and operates even in the event of a power supply interruption.

The screw shaft is conveniently telescopically mounted upon a drive shaft, the screw shaft being rotatable with the drive shaft, for example by being splined thereto. A releasable restrictor arrangement is preferably provided to restrict axial movement of the screw shaft. The releasable restrictor arrangement is preferably resettable in an automated manner.

The releasable restrictor arrangement preferably comprises a shoulder associated with the screw shaft and cooperable with at least one moveable stop member, the moveable stop member being moveable under the control of an actuator, for example a solenoid actuator, to a position in which it no longer engages the shoulder, thereby permitting axial movement of the screw shaft. The moveable stop member may comprise a pin carrying a roller arranged to bear against a ramped surface of a wedge component, the wedge component being moveable by the solenoid actuator.

In such an arrangement, in the event of a failure resulting in movement of the nut along the screw shaft no longer being possible, for example due to jamming thereof, the releasable restrictor arrangement can be operated to permit axial movement of the screw shaft, for example due to the effects of gravity acting upon the landing gear with which the actuator is associated. The axial movement of the screw shaft is accompanied by axial movement of the nut carried thereby. The movement can continue until the nut reaches its extended position, at which point the landing gear will occupy its deployed position, and the lock member, in conjunction with the tine component, serves to lock the nut, and hence the landing gear, in this position. It will thus be appreciated that the aircraft can then land in the usual manner.

If the actuator is extended in the above manner rotation of the drive shaft, whilst the nut is locked in the extended position, returns the screw shaft towards its original axial position, whereupon the releasable restrictor arrangement can be used to secure the screw shaft against axial movement, thus resetting the actuator so as to be ready for subsequent retraction of the actuator.

The invention further relates to an actuator comprising a screw shaft, a nut translatable along the screw shaft between a retracted position and an extended position, the screw shaft being telescopically mounted upon a drive shaft and rotatable therewith, and a releasable restrictor arrangement operable to restrict axial movement of the screw shaft.

The releasable restrictor arrangement is preferably re-settable in an automated manner. It may comprise a shoulder associated with the screw shaft and co-operable with the at least one movable stop member, the movable stop member being movable under the control of an electromagnetic actuator to a position in which it no longer engages the shoulder, thereby permitting axial movement of the screw shaft.

The movable stop member may comprise a pin carrying a roller arranged to bear against a ramped surface of a wedge component, the wedge component being movable by the actuator.

The actuator may further comprise lock means operable to secure the nut against axial movement when in its extended position.

As outlined above, such an arrangement has the advantage that the actuator can still be moved to and locked in its extended position even in the event of jamming or another failure in the normal operation thereof.

The invention will further be described, by way of example, with reference to the accompanying drawings, in which.

Figure 1:
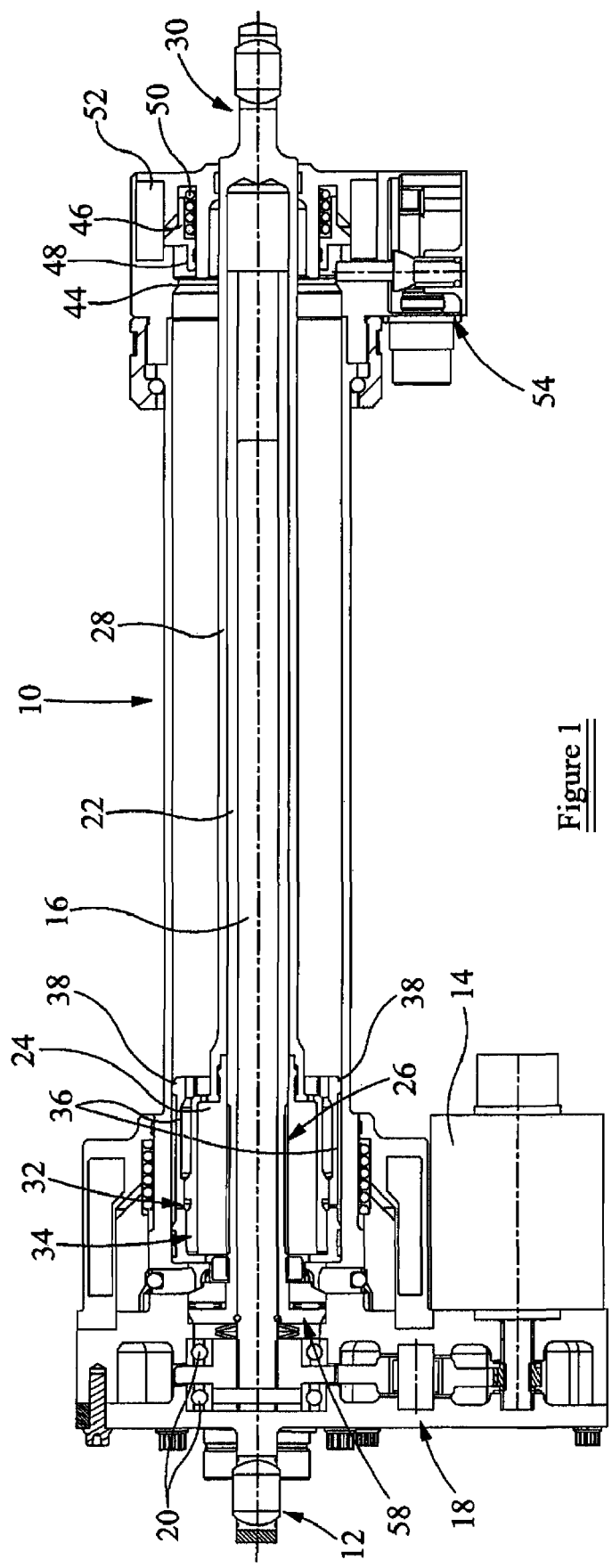
FIG. 1 is a sectional view illustrating an actuator in accordance with one embodiment of the invention in a retracted condition.
Figure 2:
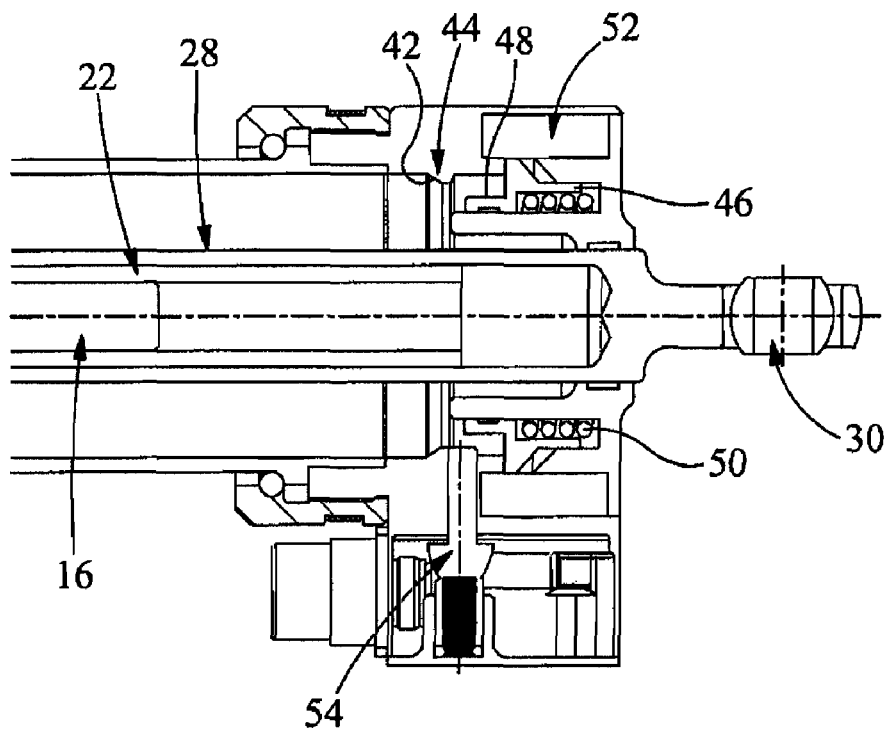
FIG. 2 is a view of part of the actuator of FIG. 1 to an enlarged scale.

The actuator illustrated in the accompanying drawings is intended for use in driving the landing gear of an aircraft between a stowed position and a deployed position. The weight of the landing gear is such that, in normal use, during deployment the actuator serves both to drive the landing gear for movement and to control the speed of movement of the landing gear, movement of the landing gear being assisted by the action of gravity. During retraction, the actuator serves to drive the landing gear towards its stowed position.

The actuator comprises a housing 10 upon which is provided a mounting 12 whereby the actuator is secured to part of the airframe structure of the aircraft. An electrically powered, brushless, permanent magnet motor 14 is secured to the housing 10 and is operable to drive a drive shaft 16 for rotation through a gear arrangement 18. The drive shaft 16 is mounted for rotation within the housing by bearings 20.

Splined to the drive shaft 16 is a screw shaft 22, the nature of the spline arrangement between the screw shaft 22 and the drive shaft 16 being such that rotation of the drive shaft 16 is transmitted to the screw shaft 22, whilst accommodating axial, telescoping movement of the screw shaft 22 relative to the drive shaft 16.

A nut 24 is coupled to the screw shaft 22 via a roller screw coupling arrangement 26, the nut 24 being mounted upon an output tube 28 upon which a mounting 30 is formed, the mounting 30 being secured, in use, to part of the landing gear. The nature of the mounting 30 is such that the output tube 28 and nut 24 are secured against rotation. In use, operation of the motor 14 to rotate the drive shaft 16 and screw shaft 22 causes the nut 24 to translate along the screw shaft 22, extending or retracting the actuator, and thus driving the landing gear between its stowed and deployed positions. The tube 28, in addition to transmitting loadings, further serves to shield the screw shaft 22 from external contaminants.

Secured to the nut 24 is a tine component 32 including a hub 34 from which extends a plurality of resilient tine fingers 36, each of which includes an outwardly extending projection 38 adjacent a free end thereof. Each projection 38 includes a ramped surface 40 cooperable, as the nut approaches its extended position, with a corresponding ramped surface 42 of an inwardly projecting, annular formation 44 formed on the housing 10. The cooperation results in the tine fingers 36 deflecting radially inwards, allowing the projections 38 to ride over the formation 44 until the fully extended position is reached, whereon the tine fingers 36 deflect radially outwardly due to their resilience.

A tubular lock member 46 is slidably mounted within the housing 10. The lock member 46 includes a region 48 of outer diameter substantially equal to that of the part of the tine component 32 formed by the tine fingers 36 so as to permit the region 48 to be received therein. The lock member 46 is slidable between a locked position and a released position, a spring 50 urging the lock member 46 towards the locked position, a solenoid actuator 52 being operable to move the lock member 46 to the released position against the action of the spring 50.

Figure 3:
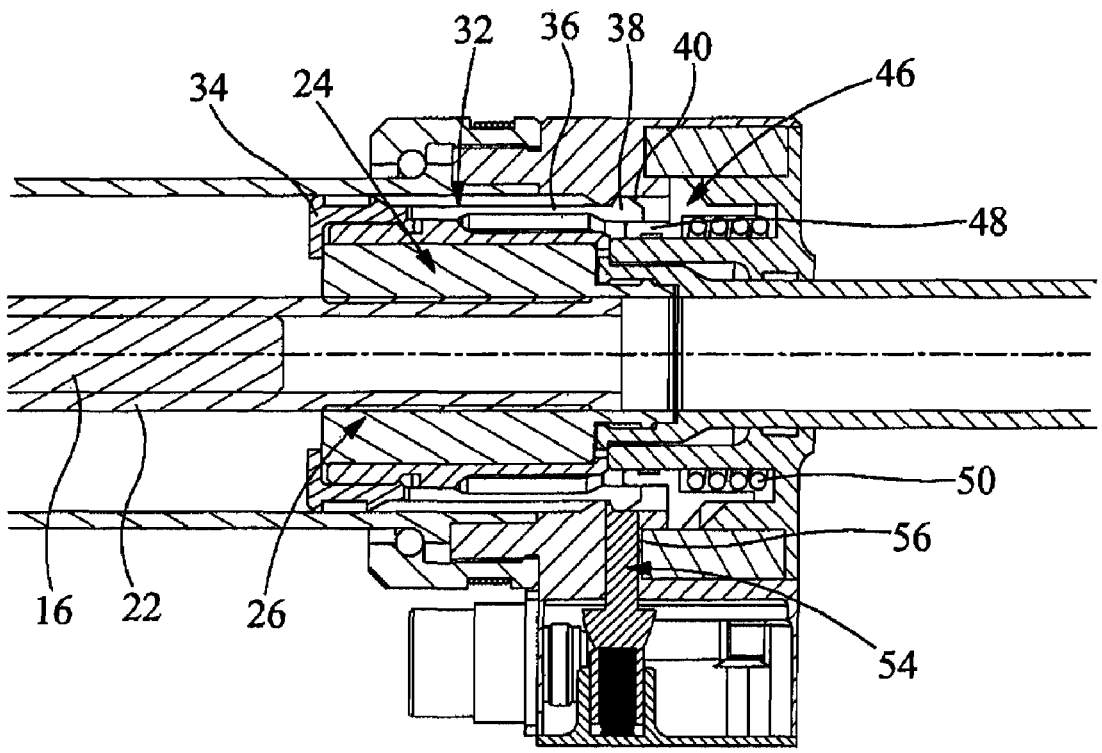
FIG. 3 is a view similar to FIG. 2 illustrating the actuator in an extended condition.

In use, rotation of the drive shaft 16 and screw shaft 22 drives the nut 24 for movement. As the nut 24 approaches the extended position, the tine fingers 36 deflect inwardly as described hereinbefore. The deflected ends of the tine fingers 36 bear against the end of the lock member 46, movement of the nut 24 resulting in the lock member 46 being pushed away from the locked position against the action of the spring 50. Once the extended position is reached, the tine fingers 36 deflect outwardly as described hereinbefore, with the result that they no longer bear against the end of the lock member 46, and the lock member 46 then returns to its locked position under the action of the spring 50, the region 48 locating within the part of the tine component 32 defined by the tine fingers 36 to prevent inward movement thereof. This position is illustrated in FIG. 3. It will be appreciated that by preventing inward movement of the tine fingers 36, the projections 38 can no longer ride over the formation 44, thus movement of the nut 24 away from the extended position is prevented.

A sensor 54 is mounted upon the housing 10, the sensor 54 including a resiliently biased moveable plunger 56 engageable with the tine fingers 36 as the tine fingers 36 deflect outwardly upon reaching the extended position, and means for monitoring the position of the plunger 56. It will be appreciated that the sensor 54 is sensitive to the actuator reaching, and becoming locked in, its extended position.

To retract the actuator, the solenoid actuator 52 is energised to move the lock member 46 to its released position in which the region 48 thereof is retracted from the tine component 32 and so no longer restricts inward deflection of the tine fingers 36. Subsequent operation of the motor 14 to drive the drive shaft 16 and screw shaft 22 for rotation causes retraction of the nut 24, the tine fingers 36 deflecting inwardly as the projections 38 ride over the formation 44 during such movement.

A releasable restrictor arrangement 58 is arranged to restrict axial movement of the screw shaft 22. The arrangement 58 comprises a shoulder 60 integrally formed with the screw shaft 22. A thrust bearing 62 is located between the shoulder 60 and a ramped annular member 64 which cooperates with a series of radial, moveable pins 66. Each pin 66 carries, at its outer end, a roller 68, the rollers 68 bearing against a ramped surface 70 of an annular wedge member 72 moveable under the control of a solenoid actuator 74.

A sensor 75 senses the status of the releasable restrictor arrangement 58.

Figure 4:
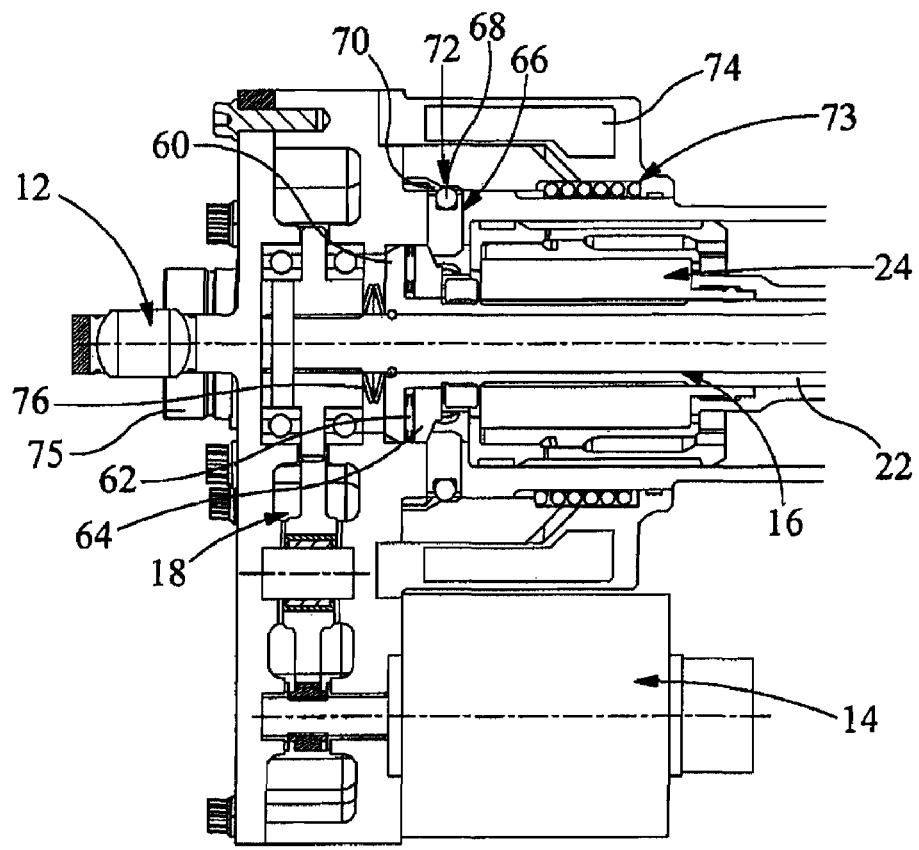
FIG. 4 is a view illustrating another part of the actuator of FIG. 1 to an enlarged scale.

In normal use, the wedge member 72 occupies the position illustrated in FIGS. 1 and 4 in which it holds the pins 66 in radially inward positions, bearing against the member 64 and resisting axial movement of the screw shaft 22. A biasing spring 73 associated with the wedge member 72 holds the wedge member 72, and the pins 66, against movement. With the screw shaft 22 secured against axial movement, it will be appreciated that operation of the motor 14 to drive the screw shaft 22 for rotation causes extension and retraction of the actuator in the manner described hereinbefore, the lock member 46 and tine fingers 36 operating in the manner described hereinbefore to lock the actuator in its extended condition.

Figure 5:
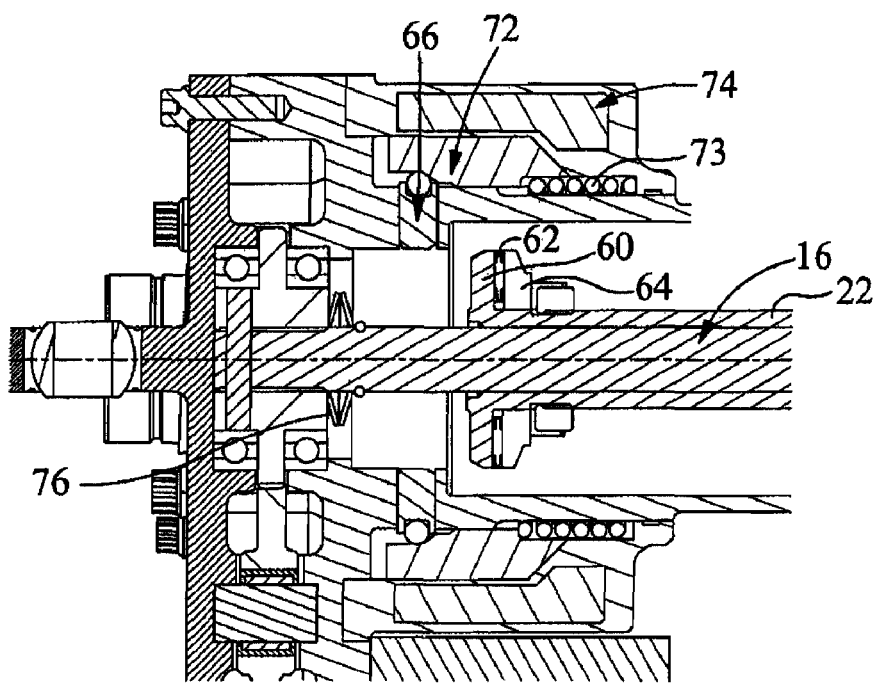
FIG. 5 is a view similar to FIG. 4 illustrating the actuator in another operating condition.
Figure 6:
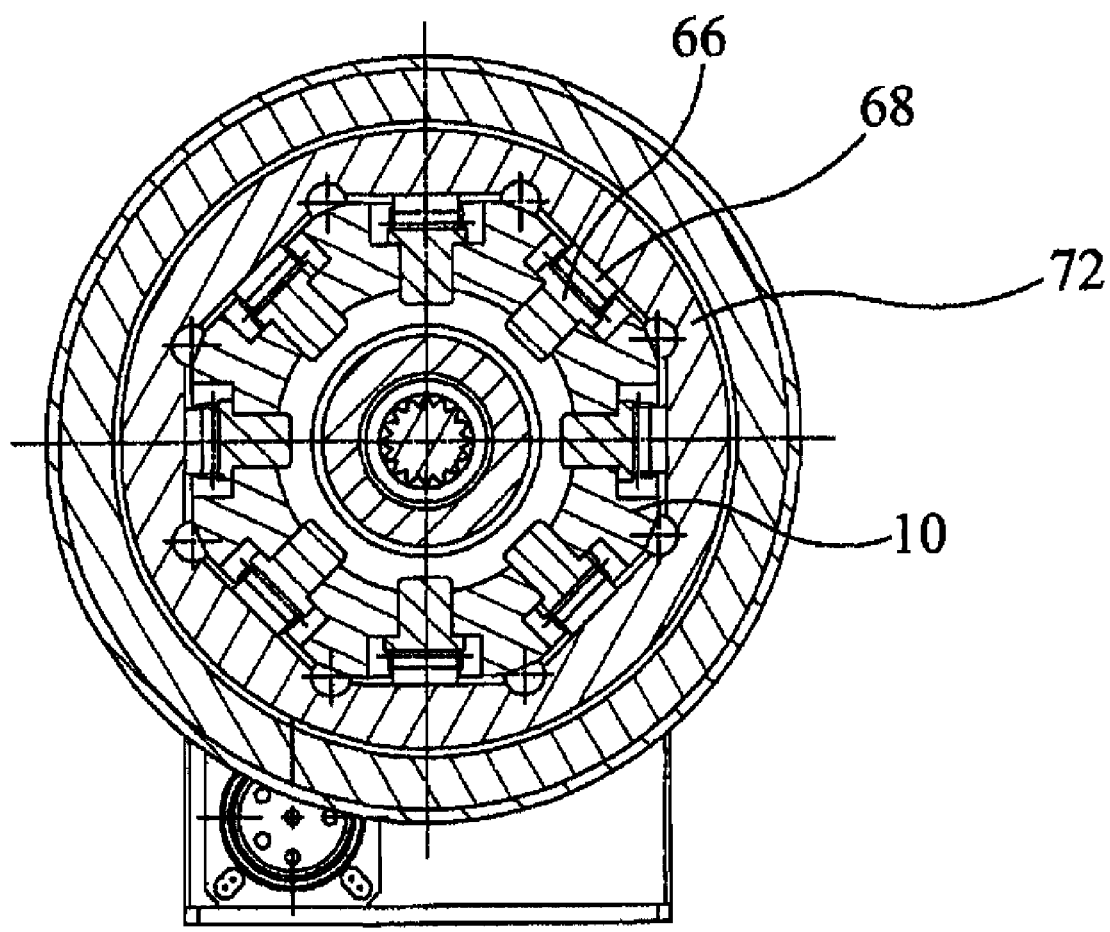
FIG. 6 is a view illustrating the releasable restrictor arrangement of the actuator of FIG. 1.

In the event that, either before or during deployment, it is sensed that the actuator is not extending correctly or will not continue to extend normally, the solenoid actuator 74 is energised, causing movement of the wedge member 72 to the position shown in FIG. 5. In this position, the cooperation between the ramped surface of the member 64 and the ends of the pins 66 can push the pins 66 outwardly, the movement of the pins 66 being permitted by the movement of the wedge member 72, allowing the member 64 and shoulder 60 to pass the pins 66, thus releasing the screw shaft 22 for axial movement. The weight of the landing gear transmitted to the actuator causes the screw shaft 22 and nut 24, together, to translate until the nut 24 reaches its extended position. Once this position is reached, the nut 24 will automatically lock in this position as described hereinbefore, even though not driven to the extended position by rotation of the screw shaft 22. It will thus be appreciated that landing of the aircraft can take place in the usual manner.

Once locked in the extended position, if it is determined that the actuator is not jammed, the motor 14 can be energised to drive the drive shaft 16, and hence the screw shaft 22, for rotation in the extend direction, the cooperation between the screw shaft 22 and the nut 24 (which is locked against axial movement and held against angular movement) urging the screw shaft 22 axially, back towards the position shown in FIG. 1. By energising the solenoid actuator 74, the screw shaft 22 is permitted to reach the position shown in FIG. 1, and subsequent de-energising thereof results in the spring biasing of the wedge member 72 returning the restrictor arrangement to the position shown, locking the screw shaft 22 against axial movement. It will be appreciated that such operation resets the actuator.

A dish spring 76 is provided between the screw shaft 22 and the bearings 20 and gear arrangement 18 to permit small amounts of axial movement of the screw shaft 22 to occur to allow contact between the screw shaft 22 and/or nut 24 and the housing 10 to permit the direct transmission of compressive loadings therebetween.

It will be appreciated that by providing an actuator in which resetting can be achieved in an automated manner, regular testing of the actuator can be undertaken, thus reducing the risk of dormant faults in the actuator passing undetected for extended periods of time.

It will be appreciated that a wide range of modifications and alterations may be made to the arrangement described hereinbefore without departing from the scope of the invention. For example, hydraulic or pneumatic actuators could be used instead of the solenoid actuators, if desired. The invention is advantageous in that the actuator can be locked, automatically, in its extended position, even in the event of a loss of power. It further provides a mechanism whereby, in the event of a jam condition being sensed, the landing gear can still be deployed, and locked in its deployed condition, and in which resetting can be achieved in an automated manner if it is sensed that resetting is permitted. Although the arrangement described hereinbefore permits automatic locking of the actuator in its extended position, extension of the actuator in the event of a jam, and automated resetting of the actuator, only some of this functionality may be provided, if desired. Further, the actuator may be used in other applications, and is not restricted to use in the deployment of aircraft landing gear.

The invention claimed is:

1. An actuator comprising a screw shaft, a nut translatable along the shaft between a retracted position and an extended position, a tine component carried by the nut, the tine component including tine fingers formed with projections each being engageable with a formation provided on a housing when the nut occupies the extended position to secure the nut against axial movement, and a lock member engageable with the tine fingers to restrict radial movement of the tine fingers.

2. An actuator according to claim 1, wherein the lock member is resiliently biased towards a locked position.

3. An actuator according to claim 2, wherein the lock member is movable away from the locked position by means of an electromagnetic actuator.

4. An actuator according to claim 2, wherein the movement of the nut towards the extended position deflects the lock member away from the locked position, the lock member returning to the locked position due to the biasing thereof, locking the nut against movement, once the extended position is reached.

5. An actuator according to claim 1, wherein the screw shaft is telescopically mounted upon a drive shaft, the screw shaft being rotatable with the drive shaft.

6. An actuator according to claim 5, further comprising a releasable restrictor arrangement to restrict axial movement of the screw shaft.

7. An actuator according to claim 6, wherein the releasable restrictor arrangement is re-settable in an automated manner.

8. An actuator according to claim 6, wherein the releasable restrictor arrangement comprises a shoulder associated with the screw shaft and co-operable with at least one movable stop member, the movable stop member being movable under the control of an electromagnetic actuator to a position in which the movable stop no longer engages the shoulder, thereby permitting axial movement of the screw shaft.

9. An actuator according to claim 8, wherein the movable stop member comprises a pin carrying a roller arranged to bear against a ramped surface of a wedge component, the wedge component being movable by the electromagnetic actuator.

10. An actuator comprising a screw shaft, a nut translatable along the screw shaft between a retracted position and an extended position, the screw shaft being telescopically mounted upon a drive shaft and rotatable therewith, and a releasable restrictor arrangement operable to restrict axial movement of the screw shaft, wherein the releasable restrictor arrangement comprises a shoulder associated with the screw shaft and co-operable with the at least one movable stop member, the movable stop member being movable under the control of an electromagnetic actuator to a position in which the movable stop no longer engages the shoulder, thereby permitting axial movement of the screw shaft.

11. An actuator according to claim 10, wherein the movable stop member comprises a pin carrying a roller arranged to bear against a ramped surface of a wedge component, the wedge component being movable by the electromagnetic actuator.

* * * * *